3,495,844
CHUCK FOR ROTARY TOOL
William C. Dee, Bournemouth, England, assignor to Gilbert C. Davis, Johannesburg, Republic of South Africa
Filed June 13, 1966, Ser. No. 557,109
Claims priority, application Great Britain, July 1, 1965, 27,846/65
Int. Cl. B23b 31/20
U.S. Cl. 279—35                                    2 Claims

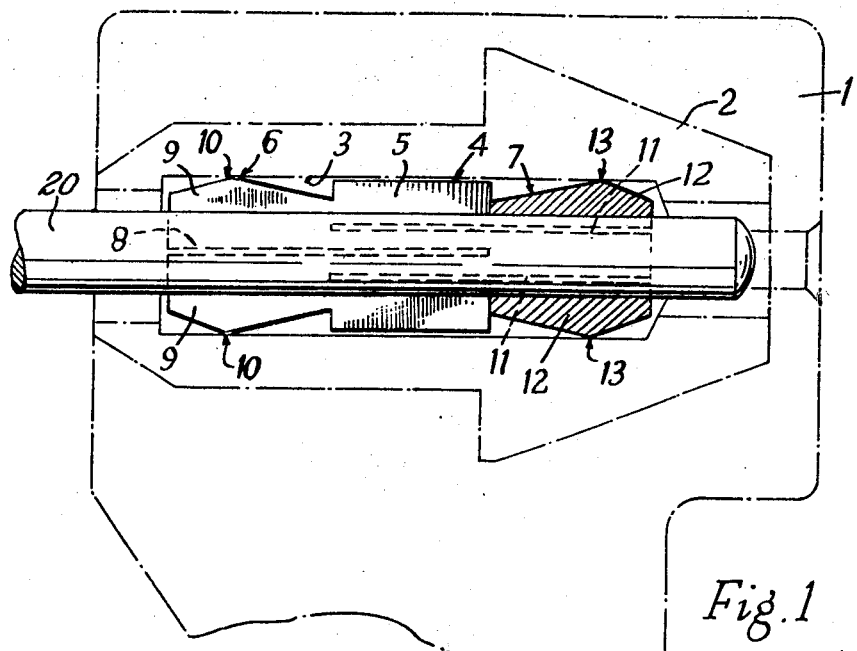
Fig. 1
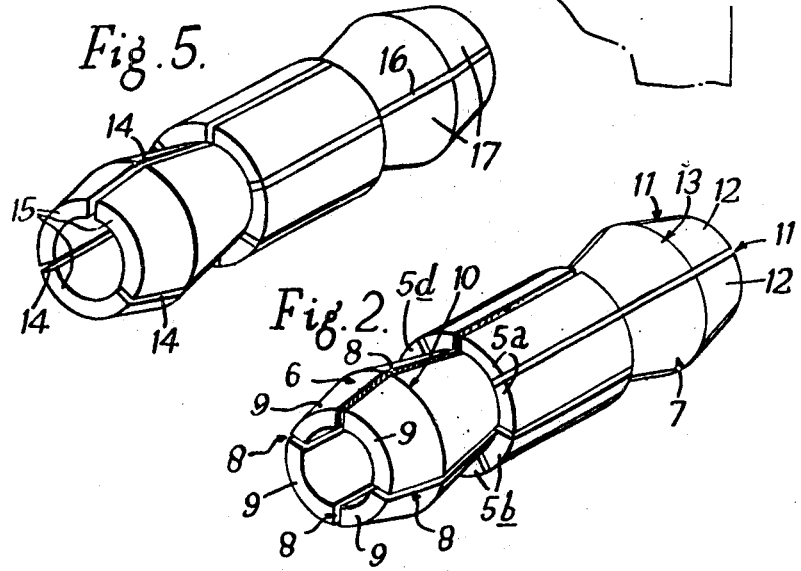
Fig. 5
Fig. 2
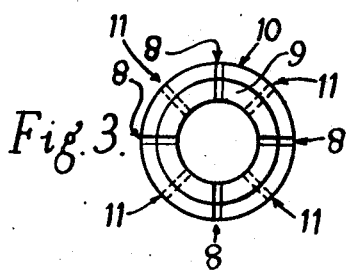
Fig. 3
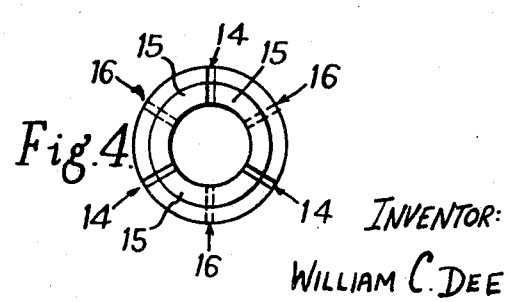
Fig. 4
INVENTOR:
WILLIAM C. DEE United States Patent Office 3,495,844
Patented Feb. 17, 1970

ABSTRACT OF THE DISCLOSURE

A chuck, for insertion in an axial bore of a rotor of a high speed tool such as a dental drill, comprises a sleeve-like body in which a number of angularly-spaced cuts extending along somewhat less than the length of the body serve to define in it a number of segments, each segment having an external radial projection to abut against the rotor bore and act as a fulcrum, one portion of the segment acting as a fly-weight and the other portion of the segment acting as a chuck jaw, the turning couple of the fly-weight acting at the fulcrum, by centrifugal force, being greater than that of the chuck jaw.

---

This invention relates to improved means for the retention of tool bits in high speed rotary tools, e.g. burrs or cutters in dental turbines.

At very high operating speeds the retention of a tool bit in a chuck has, hitherto, always been problematical due to the high centrifugal forces involved.

In dental turbines, for example, with the introduction of the ball race turbine with speeds of up to approximately 300,000 r.p.m. a chuck made of a plastics material was used and had the form of a tube screw-threaded into an axial bore of the rotor. For gripping of the tool bit, reliance was placed on the resilient deformation of the material when the shank of the tool bit was forced into the slightly smaller bore of the chuck. However, frequent replacement was necessary because frequent changing of cutters, coupled with the effects of centrifugal force, caused the plastics material to flow and so to loosen its grip.

The introduction of the air bearing turbine with possible speeds of up to 600,000 r.p.m. has necessitated a change of design, and consequently chucks made of plastics have been discarded in favour of chucks made of metal. However, these have hitherto been designed to function under simple spring-loading, and the centrifugal forces involved at high speeds counteract the force exerted by the spring-loading, thereby adversely affecting their holding power and giving rise to a danger of the cutter leaving the turbine at speed, especially after a little wear has taken place.

If the tool bit is made relatively easy to insert axially, there is usually insufficient accuracy of alignment of the tool bit axially within the rotor, and any eccentricity becomes of enormously magnified effect at the high speeds involved. If, alternatively, very close fitting surfaces are provided initially in the rotor and on the tool stem, the tool may then become very difficult or almost impossible to insert manually, and its practical use is impaired.

According to the present invention, a chuck for a high speed rotary tool comprises a plurality of radially movable chuck jaws to engage about a tool bit stem, and a plurality of fly-weights coupled to said jaws such that radially outwards movement of the fly weights under centrifugal force exerts overriding radially inwards acting force on the jaws to grip the tool bit stem.

In order that the nature of the invention may be readily ascertained, two embodiments of chuck for dental burrs are hereinafter particularly described with reference to the figures of the accompanying drawing, wherein:

FIG. 1 is an outline central vertical section of a dental handpiece;

FIG. 2 is a perspective elevation of a first embodiment of chuck;

FIG. 3 is an end elevation of the chuck of FIG. 2;

FIG. 4 is a perspective elevation of a second embodiment of chuck, and

FIG. 5 is an end elevation of the chuck of FIG. 4.

In FIG. 1, the general structure 1 of a dental handpiece, e.g. an air-bearing air-turbine, and its rotor 2, are indicated in chain-dotted line. These items are conventional and do not form part of the invention. The rotor 2 has a stepped axial bore including a portion 3 which receives a chuck indicated generally at 4 in the form of a sleeve-like receiving through it the cylindrical stem 20 of a dental burr or cutter.

The chuck 4 has a central cylindrical portion 5 and a double conical portion 6 at one end and another double-conical portion 7 at the other end of the central portion 5. Passing inwardly from one end, the portion 6 and the portion 5 include four longitudinal cuts 8 which are disposed at equal angular spacing about the axis of rotation of the chuck. These cuts serve to divide the portion 6 into a set of four chuck jaws 9 each of which seats against the bore 3 of the rotor at a fulcrum line 10. The cuts also serve to divide the central portion 5 into a set of four segmented parts 5a, 5b, 5c, 5d each of which is coupled to an end of an associated one of the chuck jaws 9.

Other equally angularly spaced longitudinal cuts 11 pass inwardly from the other end of the sleeve-like body to divide the end portion 7, four chuck jaws 12, and to define in the segmental parts 5a, 5b, 5c and 5d of the central portion into halves, the set of four cuts 11 being disposed angularly symmetrically between the cuts 8. The chuck jaws 12 each seat against the bore 3 of the rotor at a fulcrum line 13.

Each chuck jaw 9 forms, with the two central segmental parts 5a, 5a or 5b, 5b, or 5c, 5c or 5d, 5d respectively forming a continuation of it, a two-arm lever acting about a fulcrum 10. Accordingly, as the chuck revolves at high speed, the fly-weights 5a, 5a etc. fly radially outwardly and thereby force the chuck jaws 9 radially inwardly to grip onto the stem 20 of the burr, the gripping action increasing as the speed of rotation increases.

Similarly, each chuck jaw 12 forms, with the two central segmental parts 5a, 5b, or 5b, 5c or 5c, 5d, or 5d, 5a respectively forming a continuation of it, a two-arm lever acting about a fulcrum 13. The stem 20 is accordingly gripped tightly by the respective sets of chuck jaws 9 and 12 at two axially spaced points along its length.

The mass of the parts of the central portion 5 is made greater than the respective chuck jaws with which they are associated, or the axial spacing of the centres of gravity of the fly-weight from the fulcrum is made greater than that of the chuck jaw, or both.

FIGS. 4 and 5 show a chuck which is constructed in a generally similar manner, except that the longitudinal cuts 14 are symmetrically angularly spaced at 120° to provide three chuck jaws 15, and the longitudinal divisions 16 are symmetrically angularly spaced to provide three chuck jaws 17, the cuts 14 being symmetrically angularly spaced between the cuts 16.

I claim:

1. A chuck, for insertion in an axial bore of a rotor of a high speed rotary tool, comprising a sleeve-like body in which a series of segmental parts are defined by a plurality of longitudinal cuts extending from one end of said body towards the other end thereof but stopping short of said other end, each such segmental part including at a position longitudinally intermediate its ends a radial outwards projection extending circumferentially of the body to abut against the bore of the rotor and serve as a fulcrum, that portion of each segmental part which lies between the projection and said one end of the body being formed as a chuck jaw, that portion of each segmental part which lies between the projection and said other end of the body being formed as a flyweight, said flyweight portion being constructed such that the product of its mass and the distance of ts centre of gravity from the fulcrum is greater than the product of the mass of the chuck jaw portion and the distance of the centre of gravity of the chuck jaw portion from the fulcrum.

2. A chuck, for insertion in an axial bore of a rotor of a high speed rotary tool, comprising a sleeve-like body which has two series of segmental parts therein, a first such series of segmental parts being defined by a first plurality of longitudinal cuts extending from one end of said body towards the other end thereof but stopping short of said other end, the second such series of segmental parts being defined by a second plurality of longitudinal cuts extending from said other end of said body towards said one end but stopping short of said one end, the cuts of said first plurality being disposed angularly intermediate adjacent cuts of said second plurality of cuts, said first plurality of cuts overlapping axially said second plurality of cuts, each series of segmental parts including at a position longitudinally intermediate its ends a respective radial outwards projection extending circumferentially of the body to abut against the bore of the rotor and serve as a fulcrum, that portion of each segmental part which lies between the respective projection and the adjacent end of the body being formed as a chuck jaw, an axially intermediate portion of the body common to parts of each series and lying between the respective projections being formed as a flyweight, each said flyweight being constructed such that the sum of the products of its mass and the distance of its centre of gravity from each fulcrum is greater than the sum of the products of the mass of each chuck jaw and the distance of its centre of gravity from the respective fulcrum.

References Cited

UNITED STATES PATENTS

| 2,356,245 | 8/1944 | Johnston | 279—35 |
| 2,370,924 | 3/1945 | Siegenthaler | 279—35 |
| 2,481,094 | 9/1949 | Edwards | 279—46 |

FOREIGN PATENTS

| 159,435 | 3/1921 | Great Britain. |

ROBERT C. RIORDON, Primary Examiner

U.S. Cl. X.R.

279—46